United States Patent
Kohtamäki et al.

(10) Patent No.: US 12,556,087 B2
(45) Date of Patent: Feb. 17, 2026

(54) SYNCHRONOUS BUCK/BOOST PWM CONVERTERS WITH CURRENT-BASED SWITCHING

(71) Applicant: Eaton Intelligent Power Limited, Dublin (IE)

(72) Inventors: Tuomo Matias Kohtamäki, Helsinki (FI); Michael James DiGiovanni, Raleigh, NC (US); Swanand Juvekar, Cary, NC (US)

(73) Assignee: Eaton Intelligent Power Limited, Dublin (IE)

( * ) Notice: Subject to any disclaimer, the term of this patent is extended or adjusted under 35 U.S.C. 154(b) by 310 days.

(21) Appl. No.: 18/170,832

(22) Filed: Feb. 17, 2023

(65) Prior Publication Data
US 2023/0268838 A1    Aug. 24, 2023

Related U.S. Application Data

(60) Provisional application No. 63/268,245, filed on Feb. 18, 2022.

(51) Int. Cl.
*H02M 3/158*   (2006.01)
*H02M 1/00*    (2007.01)

(52) U.S. Cl.
CPC ......... *H02M 3/158* (2013.01); *H02M 1/0009* (2021.05); *H02M 1/0054* (2021.05); *H02M 3/1582* (2013.01)

(58) Field of Classification Search
CPC .. H02M 3/158; H02M 3/1582; H02M 1/0009; H02M 1/0058
See application file for complete search history.

(56) References Cited

U.S. PATENT DOCUMENTS

| | | | | |
|---|---|---|---|---|
| 9,024,610 | B2 * | 5/2015 | Philbrick | H02M 3/157 323/285 |
| 2009/0027024 | A1 * | 1/2009 | Dequina | H02M 1/38 323/283 |
| 2009/0160412 | A1 * | 6/2009 | Latham | H02M 3/1588 327/263 |
| 2011/0089915 | A1 * | 4/2011 | Qiu | H02M 3/156 323/271 |

(Continued)

OTHER PUBLICATIONS

G. Sovik, T. Urkin, E. E. Masandilov and M. Mordechai Peretz, "Optimal Self-Tuning Control for Data-Centers 48V-12V ZCS-STC," 2020 IEEE Applied Power Electronics Conference and Exposition (APEC), New Orleans, LA, USA, 2020, pp. 455-462.

(Continued)

*Primary Examiner* — Gustavo A Rosario-Benitez
(74) *Attorney, Agent, or Firm* — Stanek Lemon Crouse & Meeks, PA

(57) ABSTRACT

An apparatus includes a converter circuit (e.g., a buck/boost converter) comprising at least one transistor and a pulse width modulated (PWM) signal generator circuit configured to receive a duty command signal, to generate at least one PWM signal for the at least one transistor responsive to the duty command signal, and to selectively disable the at least one PWM signal responsive to at least one gating signal. The apparatus further includes a gating circuit configured to generate the at least one gating signal responsive to a current sense signal representing a current through the converter circuit.

12 Claims, 5 Drawing Sheets

(56) References Cited

U.S. PATENT DOCUMENTS

| | | | | |
|---|---|---|---|---|
| 2014/0043004 | A1 | 2/2014 | Abramov | |
| 2016/0233768 | A1* | 8/2016 | de Cremoux | H02M 3/1588 |
| 2016/0322900 | A1* | 11/2016 | Xu | H02M 3/1588 |
| 2017/0085168 | A1* | 3/2017 | Laur | H02M 3/158 |
| 2018/0234014 | A1* | 8/2018 | Vadnerkar | H02M 3/157 |
| 2019/0296640 | A1* | 9/2019 | Tsai | H02M 3/1588 |
| 2021/0126539 | A1* | 4/2021 | Couleur | H02M 3/1584 |
| 2021/0159796 | A1* | 5/2021 | Lee | H02M 3/158 |
| 2022/0345043 | A1* | 10/2022 | Krugly | H02M 1/0025 |
| 2023/0261575 | A1* | 8/2023 | Biziitu | H02M 1/0025 |
| | | | | 323/271 |

OTHER PUBLICATIONS

T. Urkin, G. Sovik, E. E. Masandilov and M. M. Peretz, "Digital Zero-Current Switching Lock-In Controller IC for Optimized Operation of Resonant SCC," in IEEE Transactions on Power Electronics, vol. 36, No. 5, pp. 5985-5996, May 2021.

International Search Report and Written Opinion of the International Searching Authority, International Application No. PCT/EP2023/025078, Mailed May 19, 2023.

* cited by examiner

Undesirable current direction change when complementary device switched on for remainder of switching cycle Single-comparator implementation waveform (boost)

SYNCHRONOUS BUCK/BOOST PWM CONVERTERS WITH CURRENT-BASED SWITCHING

RELATED APPLICATION

The present application claims the priority of U.S. Provisional Patent Application No. 63/268,245 entitled SYNCHRONOUS BUCK/BOOST PWM CONVERTERS WITH CURRENT-BASED SWITCHING, filed Feb. 18, 2022, and incorporated herein by reference in its entirety.

BACKGROUND

The present application relates to power electronic circuits and, more particularly, to power converters, such as buck/boost converters.

A typical boost/buck converter topology has one or more boost switches (inner devices) and one or more buck switches (outer devices). When running at light load in either mode, the converter often runs in "discontinuous conduction," a mode in which the current through the switches falls to zero before the start of the next switching cycle. In typical designs using insulated gate bipolar transistors (IGBTs), either the inner or outer devices are switched on to start conduction (depending on boost/buck mode), and then they are switched off and an anti-parallel diode connected across the complementary device is allowed to conduct until the current reaches zero and all conduction stops. IGBTs typically are not capable of conducting current in reverse direction, so they usually need large external anti-parallel diodes that are intended to carry the full load current.

However, metal oxide semiconductor field effect transistors (MOSFETs) are capable of bidirectionally conducting current due to their body diodes, so using MOSFETs can eliminate the need for large external anti-parallel diodes. When such MOSFETs are used for a boost/buck converter design, the complementary MOSFET typically needs to be turned on to conduct current instead of the body diode, as large currently passing through the relatively weak intrinsic body diode of a MOSFET may cause high losses. This presents a problem where the complementary device needs to be switched off when the current reaches zero, as the current can cross zero and go the opposite direction. This can cause additional conduction losses (thereby decreasing efficiency) and increase the ripple current experienced by a filter capacitor of the converter, which can reduce its life. A control processor running a control loop for the converter and issuing pulse width modulation (PWM) duty commands to a driver for the MOSFETs may be limited to issuing a single command per PWM period, and thus may not be able to turn off the complementary device in time to prevent such a condition.

SUMMARY

Some embodiments of the inventive subject matter provide an apparatus including a converter circuit (e.g., a buck/boost converter) comprising at least one transistor and a pulse width modulated (PWM) signal generator circuit configured to receive a duty command signal, to generate at least one PWM signal for the at least one transistor responsive to the duty command signal, and to selectively disable the at least one PWM signal responsive to at least one gating signal. The apparatus further includes a gating circuit configured to generate the at least one gating signal responsive to a current sense signal representing a current through the converter circuit.

In some embodiments, the converter circuit may include first and second transistors. The comparator circuit may include a window comparator circuit configured to generate first and second gating signals responsive to comparisons of the current sense signal to a first threshold and a second threshold, respectively. The PWM signal generator circuit may be configured to generate a first PWM signal for the first transistor and a second PWM signal for the second transistor and to selectively disable the first PWM signal and the second PWM signal responsive to the first gating signal and the second gating signal, respectively. The converter circuit may include at least one inductor coupled to a first port of the converter circuit. The first transistor may be coupled to the at least one inductor and configured to control a current from the first port through the at least one inductor responsive to the first PWM signal and the second transistor may be configured to selectively couple the at least one inductor to a second port of the converter circuit responsive to the second PWM signal.

In further embodiments, the comparator circuit may be configured to generate the at least one gating signal responsive to a comparison of the current sense signal to a zero current reference. The converter circuit may include first and second transistors and the PWM signal generator circuit may be configured to generate first and second PWM signals for the first transistor and the second transistor, respectively, and to selectively disable the first and second transistors responsive to the same gating signal.

According to further embodiments, an apparatus includes a converter circuit including at least one inductor coupled to a first port of the converter circuit, a first transistor coupled to the at least one inductor and configured to control a current from the first port through the at least one inductor responsive to a first PWM signal, and a second transistor configured to selectively couple the at least one inductor to a second port of the converter circuit responsive to a second PWM signal. The apparatus also includes a PWM signal generator circuit configured to receive a duty command signal, to generate the first and second PWM signals responsive to the duty command signal, and to selectively disable the first and second PWM signals responsive to at least one gating signal. The apparatus further includes a gating circuit configured to generate the at least one gating signal responsive to a current sense signal representing a current through the converter circuit.

Additional embodiments provide methods of operating a converter circuit including at least one transistor and a PWM signal generator circuit configured to receive a duty command signal and to generate at least one PWM signal for the at least one transistor responsive to the duty command signal. The methods include generating at least one gating signal responsive to a current sense signal representing a current through the converter circuit and selectively disabling the at least one PWM signal responsive to the at least one gating signal.

DETAILED DESCRIPTION

Figure 1:
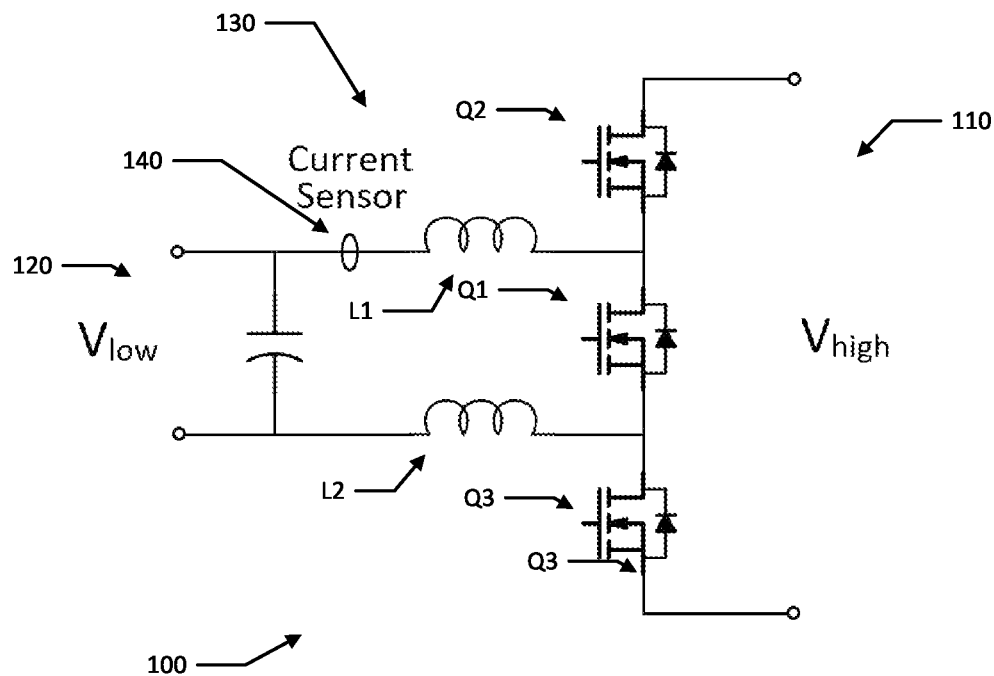
FIG. 1 is schematic diagram of a synchronous buck/boost converter employed in some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
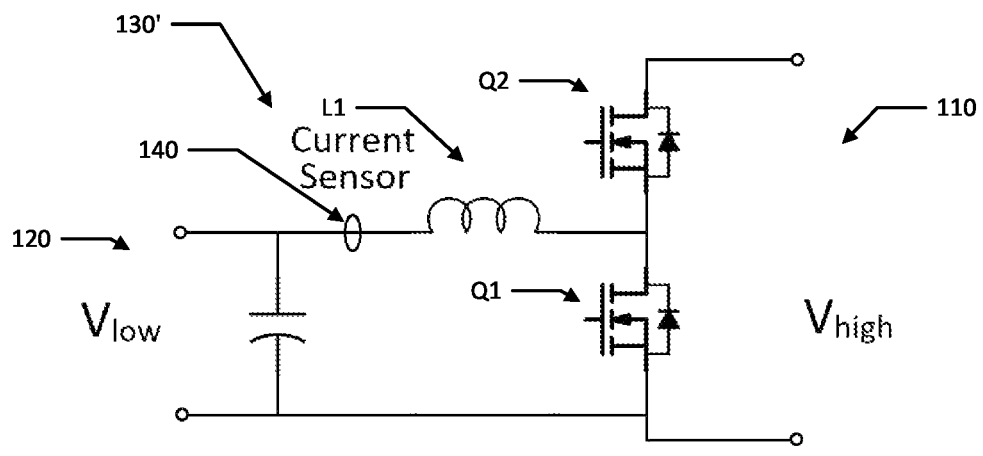
FIG. 2 is a schematic diagram of another type of synchronous buck/boost converter employed in some embodiments.

Various embodiments provide synchronous buck/boost converters configured to control active switches thereof to limit conduction losses and overheating. FIGS. 1 and 2 illustrate representative types of synchronous buck/boost converters in which embodiments of the invention may be implemented. Referring to FIG. 1, a synchronous buck/boost converter 100 has first and second DC ports 110, 120. A synchronous converter circuit 130 is coupled between the first and second DC ports 110, 120. Such a converter may be used in a variety of different applications. In some applications, for example, the first DC port 110 may be coupled to DC buses of an uninterruptible power supply (UPS), while the second DC port 120 may be coupled to a battery that supplies backup power to the UPS. In such applications, the converter circuit 130 may be operated in boost mode to provide power to the first DC port 110 from a battery coupled to the second DC power port 120 and in a buck mode to provide power from the first DC port 110 to the battery coupled to the second DC port 120.

Figure 3:
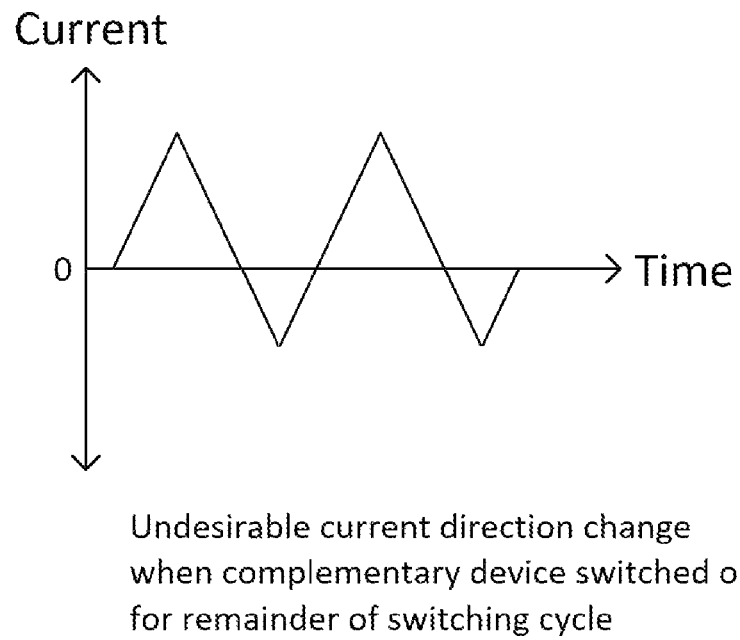
FIG. 3 is a waveform diagram illustrating current reversal in a synchronous buck/boost converter.

The converter circuit 130 includes an inner MOSFET Q1 and first and second outer MOSFETs Q2, Q3. For boost mode operation, the inner MOSFET Q1 is turned on to charge one or more inductors L1, L2 coupled in series with the second DC port 120. After the inductors L1, L2 are charged, the outer MOSFETs Q2, Q3 are turned on to conduct charge stored in the inductors L1, L2 to the first DC port 110. Because MOSFETs are capable of conducting current in either direction when on, the current direction will eventually reverse if the outer MOSFET's Q2, Q3 are left on for a sufficient duration, as illustrated in FIG. 3. This can lead to undesirable conduction losses and ripple current. If the inner MOSFET Q1 and the outer MOSFETs Q2, Q3 are driven in a pulse width modulation (PWM) mode by a controller that provides a duty command that may not be updated more than once per cycle, the outer MOSFETs Q2, Q3 may not be turned off at an optimal time. Similar problems may occur when operating in buck mode, i.e., the inner MOSFET Q1 may not be turned off before current starts reversing after the inductors L1, L2 are discharged. FIG. 2 illustrates a different synchronous buck/boost converter 100' having a converter circuit 130' comprising a single outer MOSFET Q2 and that operates boost and buck modes in a manner similar to that of the converter circuit 130 of FIG. 1 and that may exhibit similar switching problems.

Some embodiments arise from a realization that intrinsic properties of MOSFETs can be used to achieve more accurate and efficient turn off of bidirectional semiconductor devices (e.g., MOSFETs) in such synchronous buck/boost converter applications. In some embodiments, a window comparator may be used to gate PWM signals provided to MOSFET transistors of a buck/boost converter such that the MOSFETs may be turned off shortly before the current falls to zero, with the intrinsic body diodes of the MOSFETs continuing to conduct until they commutate when the current falls to zero.

Figure 4:
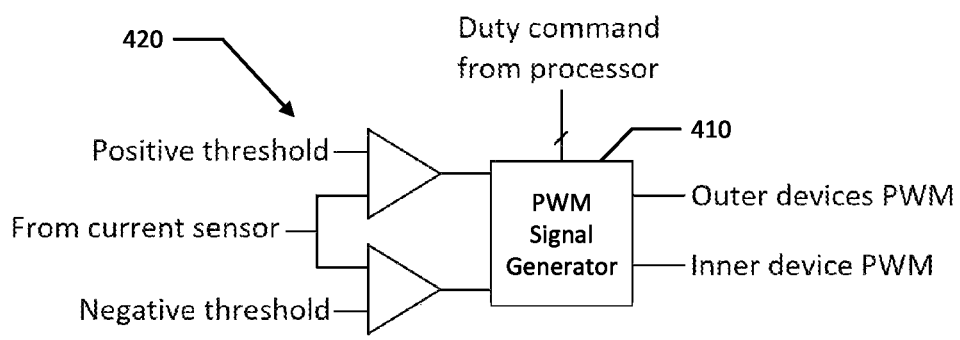
FIG. 4 is a schematic diagram of a pulse-width modulation (PWM) signal generator with current comparator gating for a synchronous buck/boost converter according to some embodiments.

FIG. 4 illustrates an example of control circuitry for controlling synchronous buck/boost converters along the lines of the converters of FIGS. 1 and 2 according to some embodiments. Referring to FIGS. 1 and 4, a PWM signal generator 410 receives a duty command from a control processor (e.g., a microcontroller or the like) and responsively generates PWM signals for the inner MOSFET Q1 and the outer MOSFETs Q2, Q3. The MOSFET PWM signals implement a duty cycle corresponding to the duty command received from the control processor. The PWM signal generator 410 is further configured to receive gating signals generated by a window comparator 420. The window comparator 420 compares a current sense signal generated by the current sensor 140 to positive and negative threshold signals and responsively generates the gating signals. The gating signals are used to selectively disable generation of the PWM signals produced by the PWM signal generator.

Figure 5:
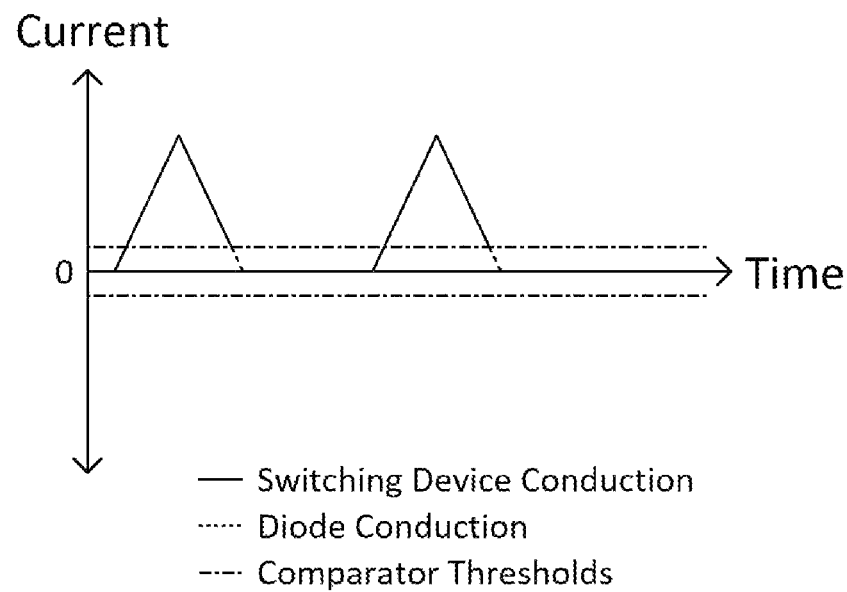
FIGS. 5 and 6 are waveform diagrams illustrating operations of a buck/boost converter controlled using the circuitry of FIG. 4.
Figure 6:
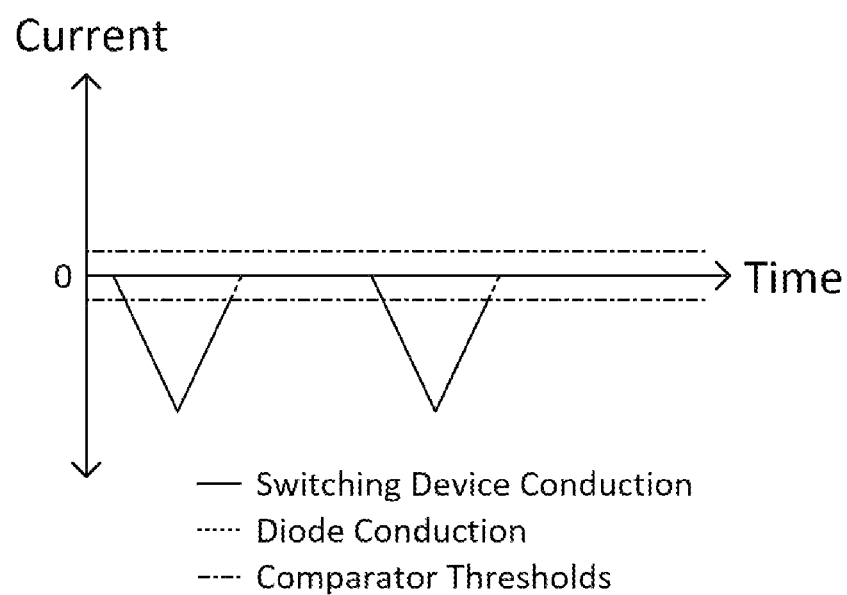

Referring to FIG. 5, when the converter is operating in boost mode and the current falls below the positive threshold, the comparator 420 applies a gating signal to the PWM signal generator 410 that disables the outer MOSFET PWM signals (i.e., fixes them to a state corresponding to "off" states of the MOSFETs being driven) and thus turns off the outer MOSFETs Q2, Q3 before the current falls to zero. After the outer MOSFETs Q2, Q3 are turned off, the intrinsic body diodes of the outer MOSFETs Q2, Q3 continue to conduct until they become reversed biased and block further conduction after the current falls to zero. In buck mode operations illustrated in FIG. 6, the comparator 420 applies a gating signal to the PWM controller 410 that disables the inner MOSFET PWM signal and thus turns off the inner MOSFET Q1 responsive to the current passing through the negative threshold. After the inner MOSFET Q1 is turned off, the intrinsic body diode of the inner MOSFET Q1 continues to conduct until it becomes reversed biased and blocks further conduction.

It will be appreciated that the PWM signal generator 410 and the comparator 420 may be implemented using any of a variety of different analog and/or digital circuit arrangements. For example, the PWM signal generator 410 may be implemented using a logic device, such as a programmable logic device (PLD) or gate array. PWM signals generated by such a device may interfaced to the controlled MOSFETs, such as the MOSFETs Q1, Q2, Q3 of FIG. 1 (or Q1, Q2 of FIG. 2) using intermediate circuitry, such as amplifiers and/or inverters. The comparator 410 may be implemented using, for example, integrated circuit comparator devices.

Figure 7:
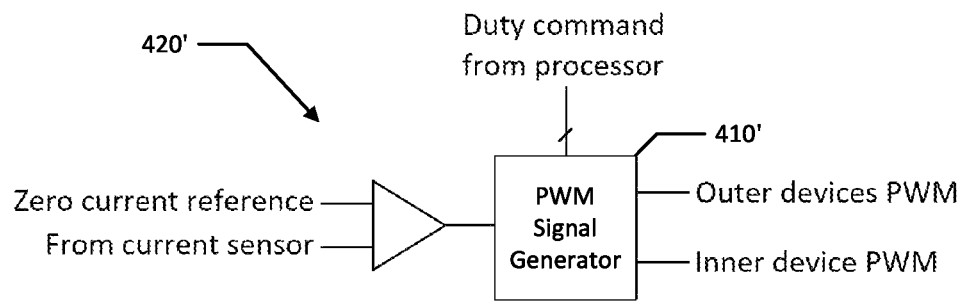
FIG. 7 is a schematic diagram of a pulse-width modulation (PWM) signal generator with current comparator gating for a synchronous buck/boost converter according to further embodiments.
Figure 8:
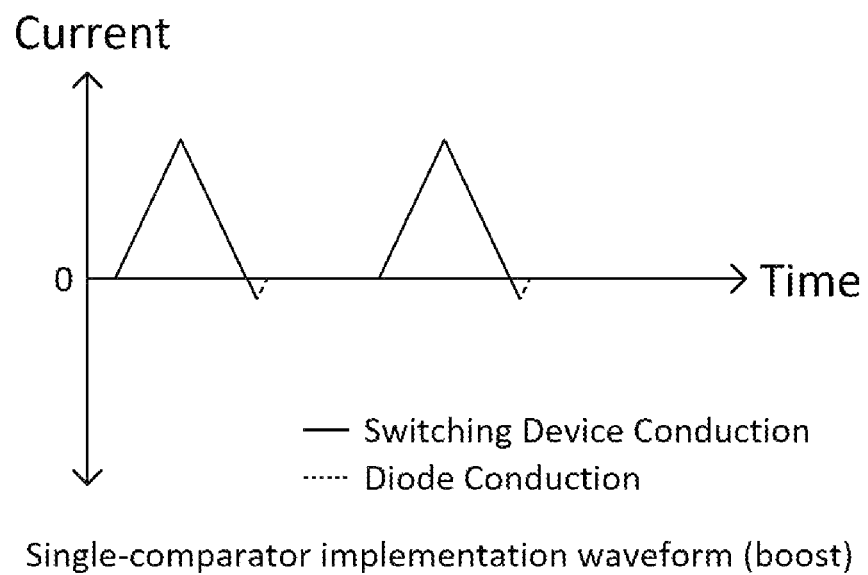
FIGS. 8 and 9 are waveform diagrams illustrating operations of a buck/boost converter controlled using the circuitry of FIG. 7.
Figure 9:
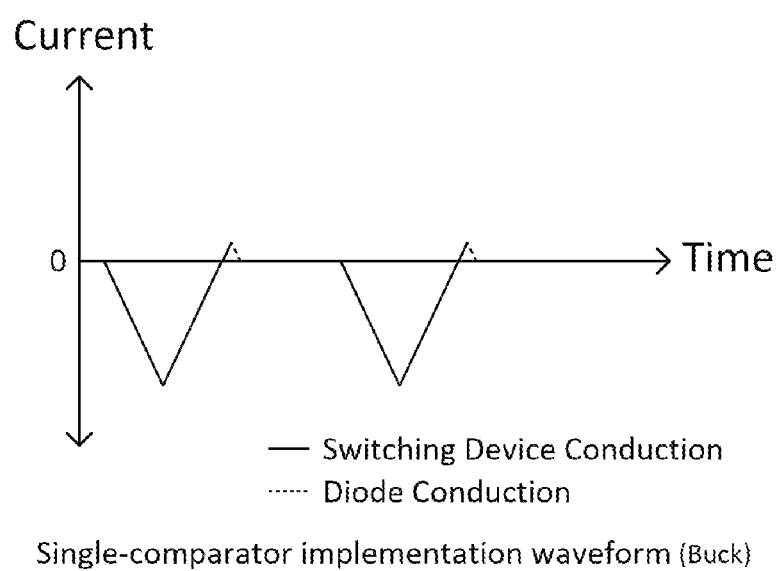

FIG. 7 illustrates another control circuit for the converters of FIGS. 1 and 2 according to further embodiments. Referring to FIGS. 1, 7 and 8, In these embodiments, a comparator circuit 420' compares the current sense signal to a single threshold at or near zero and provides a gating signal to a PWM controller 410' that generates PWM signals for the inner MOSFET Q1 and the outer MOSFETs Q2, Q3. As shown in FIG. 8, when the converter is operating in boost mode and the current passes through the comparator threshold, the comparator 420' causes the outer MOSFETs Q2, Q3 turn off. This may allow the current to reverse for a limited period but can prevent extended current reversal. Referring to FIG. 9, wherein the converter is operating in buck mode and the current passes through the comparator threshold, the comparator 420' causes the inner MOSFET Q1 to turn off. This may allow the current to reverse for a limited period but can prevent extended current reversal.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

The invention claimed is:

1. An apparatus comprising:
a converter circuit comprising a first transistor and a second transistor, each of the first transistor and the second having an intrinsic body diode;
a pulse width modulated (PWM) signal generator circuit configured to receive a duty command signal, to generate first and second PWM signals for the first and second transistors responsive to the duty command signal, and to selectively disable at least one of the first PWM signal or the second PWM signal while a forward conduction current is present through the intrinsic body diode of the respective transistor, responsive to at least one gating signal; and
a gating circuit configured to generate the at least one gating signal responsive to a current sense signal representing a current through the converter circuit,
wherein the gating circuit comprises a window comparator circuit configured to generate a first gating signal and a second gating signal responsive to comparisons of the current sense signal to a positive threshold and a negative threshold, respectively,
wherein the PWM signal generator circuit is configured to selectively disable the first PWM signal responsive to the first gating signal, and to selectively disable the second PWM signal responsive to the second gating signal, and
wherein disabling the first or second PWM signal causes the respective transistor to cease gate-driven conduction while the forward conduction current is present through the intrinsic body diode of the respective transistor, such that the forward conduction current continues to flow through the intrinsic body diode until the intrinsic body diode ceases conduction upon reverse-biasing.

2. The apparatus of claim 1:
wherein the converter circuit comprises at least one inductor coupled to a first port of the converter circuit;
wherein the first transistor is coupled to the at least one inductor and configured to control a current from the first port through the at least one inductor responsive to the first PWM signal; and
wherein the second transistor is configured to selectively couple the at least one inductor to a second port of the converter circuit responsive to the second PWM signal.

3. The apparatus of claim 1:
wherein the converter circuit comprises first and second transistors;
wherein the PWM signal generator circuit is configured to generate first and second PWM signals for the first transistor and the second transistor, respectively, and to selectively disable the first and second transistors responsive to the same gating signal.

4. The apparatus of claim 1, wherein the transistor comprises at least one field effect transistor.

5. The apparatus of claim 1, wherein the converter circuit comprises a buck/boost converter circuit.

6. An apparatus comprising:
a converter circuit comprising:
at least one inductor coupled to a first port of the converter circuit;
a first transistor having an intrinsic body diode coupled to the at least one inductor and configured to control a current from the first port through the at least one inductor responsive to a first PWM signal; and
a second transistor having an intrinsic body diode configured to selectively couple the at least one inductor to a second port of the converter circuit responsive to a second PWM signal;
a PWM signal generator circuit configured to receive a duty command signal, to generate the first and second PWM signals responsive to the duty command signal, and to selectively disable the first and second PWM signals while a forward conduction current is present through the intrinsic body diode of a corresponding transistor, responsive to at least one gating signal; and
a gating circuit configured to generate the at least one gating signal responsive to a current sense signal representing a current through the converter circuit, wherein the gating circuit comprises a window comparator circuit configured to generate a first gating signal and a second gating signal responsive to comparisons of the current sense signal to a first threshold and a second threshold, respectively, wherein the PWM signal generator circuit is configured to selectively disable at least one of the first PWM signal and the second PWM signal responsive to at least one of the first gating signal and the second gating signal, and wherein disabling the first or second PWM signal causes a corresponding transistor to cease gate-driven conduction while the forward conduction current is present through the intrinsic body diode of the transistor, such that the forward conduction current continues to flow through the intrinsic body diode until the intrinsic body diode ceases conduction in response to reverse-biasing.

7. The apparatus of claim 6, wherein the window comparator circuit is configured to generate the at least one gating signal responsive to a comparison of the current sense signal to a reference corresponding to substantially zero current that is distinct from the first threshold and the second threshold.

8. A method of operating a converter circuit comprising a first transistor and a second transistor, each of the first transistor and the second transistor having an intrinsic body diode, and a pulse width modulated (PWM) signal generator circuit configured to receive a duty command signal and to generate a first PWM signal and a second PWM signal for the first transistor and the second transistor, respectively, responsive to the duty command signal, the method comprising:
generating first and second PWM signals for the first and second transistors responsive to the duty command signal;
generating first and second gating signals using a window comparator circuit responsive to comparisons of a current sense signal representing a current through the converter circuit to a positive threshold and a negative threshold, respectively; and
selectively disabling at least one of the first PWM signal responsive to the first gating signal or the second PWM signal responsive to the second gating signal, wherein disabling the first PWM signal or the second PWM signal causes the respective transistor to cease gate-driven conduction while a forward conduction current is present through the intrinsic body diode of the respective transistor, such that the forward conduction current continues to flow through the intrinsic body diode of the respective transistor until the intrinsic body diode ceases conduction upon reverse-biasing.

9. The method of claim 8:
wherein the converter circuit comprises at least one inductor coupled to a first port of the converter circuit;
wherein the first transistor is coupled to the at least one inductor and configured to control a current from the first port through the at least one inductor responsive to the first PWM signal; and
wherein the second transistor is configured to selectively couple the at least one inductor to a second port of the converter circuit responsive to the second PWM signal.

10. The method of claim 8:
wherein selectively disabling the at least one PWM signal responsive to at least one gating signal comprises selectively disabling the first and second PWM signals responsive to the same gating signal.

11. The method of claim 8, wherein the at least one transistor comprises at least one field effect transistor.

12. The method of claim 8, wherein the converter circuit comprises a buck/boost converter circuit.

* * * * *